(12) United States Patent
Katoh et al.

(10) Patent No.: US 8,651,997 B2
(45) Date of Patent: Feb. 18, 2014

(54) PLANETARY GEAR REDUCER

(75) Inventors: Yoshinobu Katoh, Kariya (JP);
Hiromichi Ota, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/883,064

(22) PCT Filed: Sep. 20, 2011

(86) PCT No.: PCT/JP2011/071340
§ 371 (c)(1),
(2), (4) Date: May 2, 2013

(87) PCT Pub. No.: WO2012/063555
PCT Pub. Date: May 18, 2012

(65) Prior Publication Data
US 2013/0225354 A1    Aug. 29, 2013

(30) Foreign Application Priority Data
Nov. 10, 2010    (JP) .................................. 2010-251621

(51) Int. Cl.
*F16H 57/08*    (2006.01)
(52) U.S. Cl.
USPC ......................................... 475/331; 475/163
(58) Field of Classification Search
USPC ......... 475/162, 163, 165, 168, 169, 178, 331, 475/346
See application file for complete search history.

(56) References Cited

U.S. PATENT DOCUMENTS

| | | | | |
|---|---|---|---|---|
| 4,594,915 A | * | 6/1986 | Braren | 475/168 |
| 5,651,588 A | * | 7/1997 | Kato | 301/35.626 |
| 5,655,985 A | * | 8/1997 | Herstek | 475/179 |
| 6,851,759 B2 | * | 2/2005 | Meeker et al. | 301/105.1 |
| 7,044,563 B2 | * | 5/2006 | Suzuki | 301/105.1 |
| 7,047,645 B2 | * | 5/2006 | Kaneko | 29/894.362 |
| 2003/0224893 A1 | * | 12/2003 | Tsurumi | 475/163 |
| 2006/0025271 A1 | * | 2/2006 | Egawa | 475/163 |
| 2006/0213307 A1 | | 9/2006 | Haga et al. | |
| 2007/0243967 A1 | * | 10/2007 | Haga et al. | 475/162 |
| 2007/0269155 A1 | * | 11/2007 | Mori et al. | 384/544 |
| 2008/0207377 A1 | * | 8/2008 | Tsurumi et al. | 475/168 |
| 2011/0245030 A1 | * | 10/2011 | Wakida et al. | 475/331 |

* cited by examiner

FOREIGN PATENT DOCUMENTS

| | | |
|---|---|---|
| JP | 5 60184 | 3/1993 |
| JP | 6 241283 | 8/1994 |
| JP | 2006 263878 | 10/2006 |

OTHER PUBLICATIONS

International Search Report Issued Dec. 13, 2011 in PCT/JP11/71340 Filed Sep. 20, 2011.

*Primary Examiner* — Justin Holmes
(74) *Attorney, Agent, or Firm* — Oblon, Spivak, McClelland, Maier & Neustadt, L.L.P.

(57) ABSTRACT

In a planetary gear device, a first side plate as carrier is formed to a disc plate shape and secures thereto pins to protrude the pins from one end surface in an axial direction. The outside diameter of the first side plate is formed to be a small diameter on one side in the axial direction and a large diameter on the other side in the axial direction. The first side plate is provided with press-fitting hole portions with the pins press-fitted thereinto and small-diameter side concavities that are formed on the press-fitting hole portions on one side in the axial direction, that open to one end surface in the axial direction of the first side plate and that have internal surfaces being out of contact with the pins at at least parts thereof.

9 Claims, 7 Drawing Sheets

PLANETARY GEAR REDUCER

TECHNICAL FIELD

The present invention relates to a planetary gear reducer in which the revolution center of a planetary gear is located inside the planetary gear.

BACKGROUND ART

JP2006-263878 A describes a mechanism in a planetary gear reducer having the revolution center of a planetary gear located inside the planetary gear in which mechanism in order to transmit the rotation movement only of the planetary gear to a carrier, a plurality of engaging holes are formed in the planetary gear and pins passing through the engaging holes are integrally formed on the carrier.

SUMMARY OF THE INVENTION

Problem to be Solved by the Invention

However, where portions forming the pins are manufactured by cutting in order to integrally form the carrier and the pins, the cost for part manufacturing rises.

The present invention has been made taking the circumstance like this into consideration, and an object thereof is to provide a planetary gear device capable of being manufactured at a low cost without integrally forming a carrier and pins.

Measures to Solve the Problem (1) A planetary gear reducer according to the present invention comprises a planetary gear having a revolution center located inside the planetary gear and provided with a plurality of engaging holes passing therethrough in an axial direction; a carrier; and a plurality of pins secured to the carrier and passing through the engaging holes for operating the carrier together with rotation movement of the planetary gear through engagements with the engaging holes; wherein the carrier is provided with a first side plate that is formed to a disc plate shape and that fixes the pins thereto to protrude the pins from one end surface in the axial direction; wherein the outside diameter of the first side plate is formed to be a small diameter on one side in the axial direction and a large diameter on the other side in the axial direction; and wherein the first side plate is provided with press-fitting hole portions with the pins press-fitted thereinto and small-diameter side concavities that are formed at the press-fitting hole portions on the one side in the axial direction, that open to the one end surface in the axial direction of the first side plate and that have internal surfaces being out of contact with the pins at at least parts thereof.

The cost for part manufacturing can be reduced by, like the invention, forming as separate members the first side plate and the pins which constitute a carrier, and by press-fitting and securing the pins to the first side plate. There arises an anxiety that a stress is generated in the first side plate as a result of press-fitting the pins into the first side plate and hence that the first side plate is deformed. The present inventors have found that where the press-fitting holes are formed in the first side plate over the whole in the axial direction, the press-fittings of the pins into the press-fitting holes cause the first side plate to be deformed, whereby the degree of parallelization between the plurality of pins is deteriorated. Where the degree of parallelization between the plurality of pins is deteriorated like this, the contact state of the pins with the engaging holes becomes worse, and this causes the service life to be shortened due to local wears on the pins and the fluctuation in transmitted torque to increase.

Accordingly, as a result of repeating enthusiastic study for this cause, the present inventors have found out a cause that deteriorates the degree of parallelization between the plurality of pins where the pins are press-fitted into the first side plate and then have reached the present invention. The cause is that where the outside diameter of the first side plate differs in the axial direction, the first side plate is lower in rigidity on a small-diameter side than on a large-diameter side, and hence that the deformation amount on the small-diameter side of the first side plate becomes large when the pins are press-fitted into the first side plate over the whole in the axial direction. Therefore, according to the present invention, there is taken a construction that small-diameter side concavities having internal surfaces which are out of contact with the pins at at least parts thereof are formed on the small-diameter side of the first side plate being low in rigidity.

With this, press-fitting forces by the pins are not exerted on the pars of the first side plate that have the small-diameter side concavities. Thus, the press-fitting forces act not to deform the parts. On the other hand, the large-diameter side of the first side plate is high in rigidity in comparison with the small-diameter side. That is, when the pins are press-fitted into the press-fitting hole portions, it becomes possible to well balance the amount by which the part on the large-diameter side of the first side plate is deformed in the radial direction, with the amount by which the part on the small-diameter side of the first side plate is deformed in the radial direction. As a result, the degree of parallelization between the plurality of pins can be made to be accurate. Accordingly, by suppressing local wears on the pins, it can be realized to prolong the service life, and it is possible to reduce the fluctuation in transmitted torque.

(2) Further, it is preferable to take a construction that the internal surface of the small-diameter side concavity has parts whose distances from the center of the press-fitting hole portion are longer than the radius of the press-fitting hole portion and that the parts are located, as viewed in the axial direction, on at least the radial inside and the radial outside of the first side plate with respect to the press-fitting hole portion.

With this, the pin has the parts that do not contact the first side plate, on the radial inside and the radial outside of the first side plate around the end surface on the small-diameter side of the first side plate. As a result, it can be suppressed that on the small-diameter side of the first side plate, the pin exerts a stress in the radial direction of the first side plate on the first side plate. Accordingly, the degree of parallelization between the plurality of pins can be made to be accurate reliably.

(3) Further, it is preferable that the internal surface of the small-diameter side concavity is formed to be out of contact with the pin over the whole circumference thereof. With this, the pin does not contact the first side plate over the whole circumference thereof around the end surface on the small-diameter side of the first side plate. Thus, it can be suppressed further reliably that on the small-diameter side of the first side plate, the pin exerts a stress in the radial direction of the first side plate on the first side plate. Accordingly, the degree of parallelization between the plurality of pins can be made to be accurate reliably.

(4) Further, it is preferable that the press-fitting hole portions are formed in the axial direction between the other end surface in the axial direction and the small-diameter side concavities of the first side plate. That is, the pins are press-fitted up to the end surface on the large-diameter side of the first side plate. In this case, each pin insertion hole formed in the first side plate is configured by a hole of the diameter corresponding to the press-fitting hole portion and a hole of the shape corresponding to the small-diameter side concavity. Thus, it is possible to form the pin insertion hole by machining steps being few in number.

(5) Further, a construction may be taken that the first side plate is provided with large-diameter side concavities formed at the press-fitting hole portions on the other side in the axial direction, opening to the other end surface in the axial direction of the first side plate, and having internal surfaces being out of contact with the pins and that the press-fitting hole portions are formed in the axial direction between the small-diameter side concavities and the large-diameter side concavities.

In this case, the press-fitting hole portions are formed with the small-diameter side concavities on one side in the axial direction and the large-diameter side concavities on the other side in the axial direction. That is, the press-fitting force by the pin is not imparted on the part of the first side plate having the large-diameter side concavity. Thus, the press-fitting force does not act to deform the part. Here, since the part on the small-diameter side of the first side plate is formed with the small-diameter side concavities, the small-diameter side concavities do not act to deform the part. That is, when the pins are press-fitted into the press-fitting hole portions, it becomes possible to well balance the amount by which the part on the large-diameter side of the first side plate is deformed in the radial direction, with the amount by which the part on the small-diameter side of the first side plate is deformed in the radial direction. As a result, the degree of parallelization between the plurality of pins can be made to be accurate.

(6) Further, a construction may be taken that the pin is provided with a press-fitting shaft portion and an engaging head portion formed at an end portion of the press-fitting shaft portion and being larger in circumscribed circle diameter of the press-fitting shaft portion and that the large-diameter side concavity receives the engaging head portion and engages and stops the engaging head portion.

Since the engaging head portion is engaged with and stopped by the large-diameter side concavity, the pin can be restrained from moving toward one side in the axial direction relative to the first side plate. Thus, in attaching the pins to the first side plate, it can be done reliably to position the pins. Further, since where the pins have the engaging head portions, the engaging head portions are received in the large-diameter side concavities, it is possible to decrease the amount by which the engaging head portions of the pins protrude from the end surface on the large-diameter side of the first side plate. Like this, the large-diameter side concavities can serve to have a plurality of functions.

(7) Further, a construction may be taken that the carrier is provided with a second side plate arranged to face the first side plate to put the planetary gear between itself and the first side plate and fixing the pins thereto. That is, the first side plate and the second side plate are arranged to put the planetary gear from both sides. Where the construction is taken like this, it is possible to stabilize the transmission of rotation force between the planetary gear and the carrier. Particularly, even where the plurality of pins are press-fitted into the first side plate, the degree of parallelization between the plurality of pins can be made to be accurate, and thus, it is possible to fix the pins to the second side plate easily and reliably.

FORMS FOR PRACTICING THE INVENTION

Figure 1:
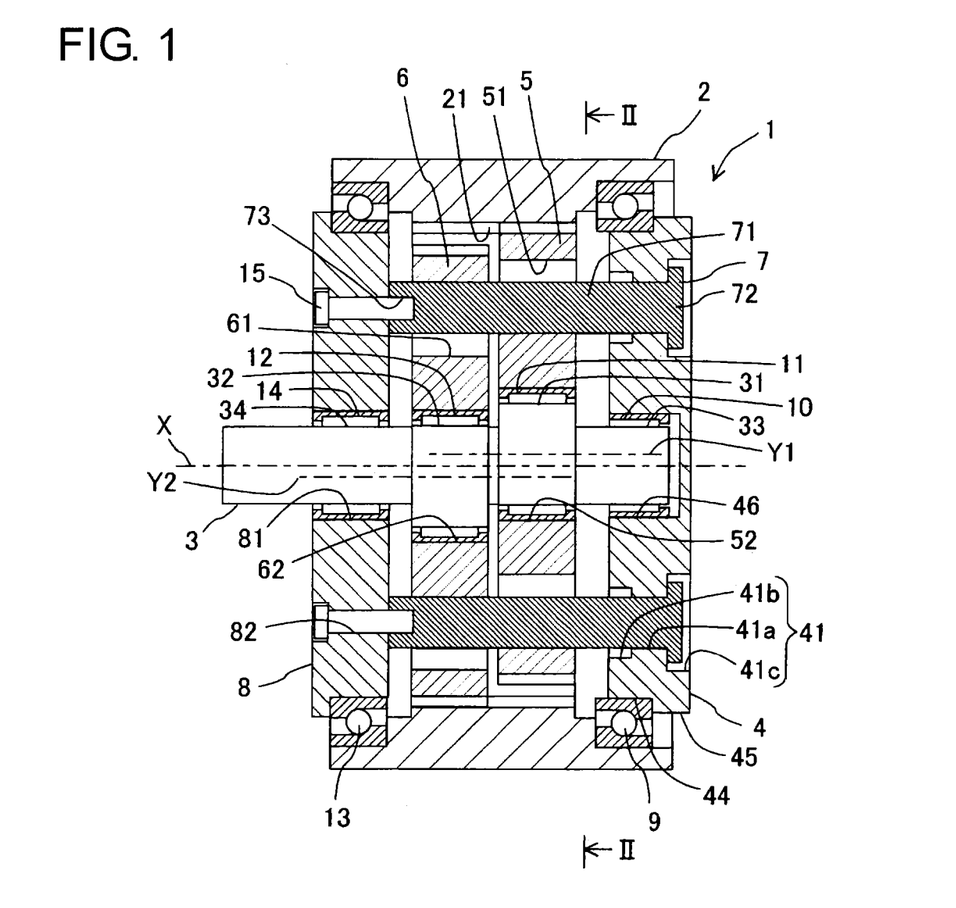
[FIG. 1] is a sectional view showing the whole of a planetary gear reducer in a first embodiment and is the sectional view taken along line I-I in FIG. 2.
Figure 2:
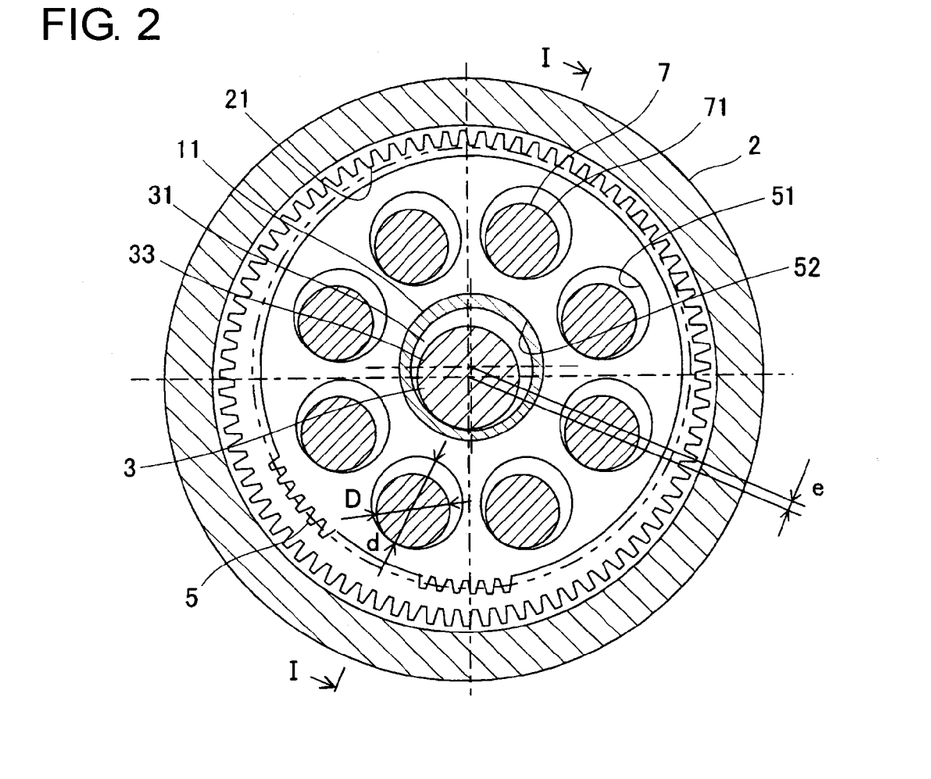
[FIG. 2] is a sectional view taken along the line II-II in FIG. 1.

A planetary gear reducer 1 in the present embodiment will be described with reference to FIGS. 1 and 2. The planetary gear reducer 1 in the present embodiment constitutes eccentric portions by eccentric cam portions 31, 32 of a crankshaft 3, is provided with two planetary gears 5, 6 being external gears rotatably supported on the eccentric cam portions 31, 32 and is constructed to place the two planetary gears 5, 6 between first and second side plates 4, 8 serving as carrier.

The planetary gear reducer 1 is constructed in detail as described hereinafter. The planetary gear reducer 1 is mainly provided with a housing 2, the crankshaft 3, the first and second side plates 4, 8 as the carrier, the first and second planetary gears 5, 6 and a plurality of pins 7. The housing 2 takes a cylindrical shape and is formed with an internal gear 21 on the internal surface thereof. Angular rolling bearings 9, 13 are provided on axially opposite sides of the internal gear 21 on the internal surface of the housing 2.

The crankshaft 3 is inserted at the center of the housing 2 and is provided with the first and second eccentric cam portions 31, 32 at an axial center portion thereof and columnar shaft portions 33, 34 on the opposite end sides thereof. Bearings 10, 14 are provided around the external surfaces of the columnar shaft portions 33, 34 of the crankshaft 3. The columnar shaft portions 33, 34 of the crankshaft 3 are supported by the housing 2 through the side plates 4, 8, so that the crankshaft 3 is supported rotatably about an input-output axis X relative to the housing 2.

The first and second eccentric cam portions 31, 32 are formed to be circular in radial section shape and are eccentric each to have an eccentricity e (indicated in FIG. 2) relative to the rotational center axis (input-output axis) X of the crankshaft 3. That is, the first eccentric portion 31 has the center axis at Y1, while the second eccentric portion 32 has the center axis at Y2. The center axis Y1 of the first eccentric cam portion 31 and the center axis Y2 of the second eccentric corn portion 32 are in axial symmetry, that is, are shifted through an angle of 180 degrees in phase. Bearings 11, 12 are provided around the external surfaces of the first and second eccentric cam portions 31, 32.

The first and second planetary gears 5, 6 are external gears and are formed with center holes 52, 62 being coaxial with the center axis of the external gears. The internal surfaces of the respective center holes 52, 62 are provided thereon with the bearings 11, 12 held on the first and second eccentric cams 31, 32. That is, the first planetary gear 5 is supported rotatably on the first eccentric cam portion 31. Further, the second planetary gear 6 is supported rotatably on the second eccentric cam portion 32. Accordingly, the input-output axis X being the revolution center of the first and second planetary gears 5, 6 is located inside the first and second planetary gears 5, 6.

The external gears of the first and second planetary gears 5, 6 are each formed to a pitch diameter of such a gear that meshes with the internal gear 21 at at least one place. Further, the first and second planetary gears 5, 6 differ from the internal gear 21 in number of teeth. That is, when the first and second planetary gears 5, 6 each revolve relative to the internal gear 21 through one turn, the external gear and the internal gear are shifted in phase by the difference in number of teeth therebetween. Further, each of the first and second planetary gears 5, 6 is formed with a plurality of engaging holes 51, 61 passing therethrough in the axial direction, at an equiangular interval in the circumferential direction. In the present embodiment, FIG. 2 shows the case that the first and second planetary gears 5, 6 are each formed with eight engaging holes 51, 61. The engaging holes 51, 61 have an inside diameter d (indicated in FIG. 2). As shown in FIG. 1, press-fitting shaft portions 71 of the pins 7 pass through the engaging holes 51, 61 and are always inscribed in the engaging holes 51, 61 at parts of the external surfaces thereof.

The first and second side plates 4, 8 constituting the carrier are each formed to a disc plate shape and are arranged to place the first and second planetary gears 5, 6 therebetween in the axial direction. Then, the first and second side plates 4, 8 are fixed to each other through the pins 7. The pins 7 pass through the engaging holes 51, 61 of the first and second planetary gears 5, 6, as mentioned earlier. Hereinafter, the first and second side plates 4, 8 and the pins 7 will be described in detail.

The external surface of the first side plate 4 is formed stepwise in the axial direction. The first side plate 4 has an external surface 44 with the outside diameter made to be a small diameter on one side in the axial direction (left side in FIG. 1) and also has an external surface 45 with the outside diameter made to be a large diameter on the other side in the axial direction (right side in FIG. 1). Then, an inner race of the angular rolling bearing 9 is provided around the external surface 44 on the small-diameter side of the first side plate 4, and an end surface of the inner race of the angular rolling bearing 9 is in contact with a stepped end surface on the external surface of the first side plate 4. That is, the first side plate 4 is supported by the angular rolling bearing 9 rotatably about the input-output axis X relative to the housing 2.

Further, a circular concavity 46 centered on the input-output axis X is formed at the radial center of the first side plate 4. A bearing 10 held on the columnar shaft portion 33 of the crankshaft 3 is provided in the internal surface of the circular concavity 46. That is, the first side plate 4 supports the columnar shaft portion 33 of the crankshaft 3 rotatably about the input-output axis X.

The first side plate 4 is formed with a plurality of holes 41 passing therethrough, at an equiangular interval in the circumferential direction. Each of the holes 41 is provided with a press-fitting hole portion 41a formed at the center portion in the axial direction, a small-diameter side concavity 41b formed on one side (left side in FIG. 1) in the axial direction of the press-fitting hole portion 41a, and a large-diameter side concavity 41c formed on the other side (right side in FIG. 1) in the axial direction of the press-fitting hole portion 41a. The press-fitting hole portion 41a, the small-diameter side concavity 41b and the large-diameter side concavity 41c take a circular shape in cross-section and are formed coaxially.

The press-fitting hole portions 41a are parts into which the press-fitting shaft portions 71 of the pins 7 are inserted. For this purpose, the inside diameter of the press-fitting hole portions 41a before the press-fittings of the pins 7 is formed to be slightly smaller than the outside diameter of the press-fitting shaft portions 71 of the pins 7. The inside diameters of the small-diameter side concavity 41b and the large-diameter side concavity 41c are formed to be larger than that of the press-fitting hole portion 41a. Specifically, the internal surfaces of the small-diameter side concavity 41b and the large-diameter side concavity 41c are formed not to contact the press-fitting shaft portion 71 of the pin 7. The small-diameter side concavity 41b and the large-diameter side concavity 41c are formed to take a circular shape in cross-section.

Further, the large-diameter side concavity 41c receives an engaging head portion 72 of the pin 7 therein. Then, the internal surface of the large-diameter side concavity 41c is formed to be out of contact with the engaging head portion 72 of the pin 7. In FIG. 1, suitable adjustment can be made regarding the inside diameter and the axial depth of the small-diameter side concavity 41b and the inside diameter and the axial depth of the large-diameter side concavity 41c.

The pin 7 is provided with the press-fitting shaft portion 71 that has an outside diameter D (indicated in FIG. 2) being identical in the axial direction, and the engaging head portion 72 that is integrally formed on the other end (right side in FIG. 1) in the axial direction of the press-fitting shaft portion 71 and that is larger in circumscribed circle diameter than the press-fitting shaft portion 71. The outside diameter D of the press-fitting shaft portion 71 is formed to be smaller than the inside diameter d of the engaging holes 51, 61 of the first and second planetary gears 5, 6. Here, the relation between the inside diameter d of the engaging holes 51, 61 and the outside diameter D of the press-fitting shaft portion 71 is established to satisfy $\{d=2 \times e+D\}$.

Each pin 7 is inserted into the hole 41 of the first side plate 4 from the large-diameter side concavity 41c side and is protruded from one end surface in the axial direction of the first side plate 4. At this time, the press-fitting shaft portion 71 of each pin 7 is press-fitted into the press-fitting hole portion 41a of the first side plate 4 and at the same time, passes through the engaging holes 51, 61 of the first and second planetary gears 5, 6. Then, the press-fitting shaft portion 71 of the pin 7 is revolved while being continually inscribed in the internal surfaces of the engaging holes 51, 61.

Further, each engaging head portion 72 is engaged with an end surface of the large-diameter side concavity 41c to be stopped thereby. Further, a female screw 73 extending in the axial direction is formed at one end (left end in FIG. 1) in the axial direction of the press-fitting shaft portion 71. In this manner, by being press-fitted at the press-fitting shaft portion 71 into the press-fitting hole portion 41a, each pin 7 is secured to the first side plate 4, and by being engaged at the engaging head portion 72 with the large-diameter side concavity 41c to be stopped thereby, each pin 7 acts to press the first side plate 4 toward one side (left side in FIG. 1) in the axial direction and thereby, to apply a preload to the angular rolling bearing 9.

The external surface of the second side plate 8 is formed stepwise in the axial direction. Then, the angular rolling bearing 13 is provided around the external surface on the small-diameter side of the second side plate 8, and the second side plate 8 is supported by the angular rolling bearing 13 rotatably about the input-output axis X relative to the housing 2. The second side plate 8 is formed with a circular hole 81 at the center in the radial direction. A bearing 14 held on the columnar shaft portion 34 of the crankshaft 3 is provided in the internal surface of the circular hole 81. That is, the second side plate 8 supports the columnar shaft portion 34 of the crankshaft 3 rotatably about the input-output axis X.

The second side plate 8 is formed with holes 82 passing therethrough in the axial direction, at an equiangular intervals in the circumferential direction. The respective holes 82 are formed respectively in coaxial alignments with the holes 41 of the first side plate 4. Bolts 15 are inserted into the holes 82 from the left side in FIG. 1. The bolts 15 are screw-engaged with the female screws in the press-fitting shaft portions 71 of the pins 7. In this manner, the first side plate 4, the second side plate 8 and the pins 7 are secured integrally. Here, by adjusting the length of the press-fitting shaft portions 71 of the pins 7, it can be done to apply a preload to the angular rolling bearing 9, 13 in the state that these three are secured.

Next, the operation of the planetary gear reducer 1 will be described. As shown in FIG. 1, when the crankshaft 3 as an input shaft is rotated about the input-output axis X, the first and second eccentric cam portions 31, 32 are revolved around the input-output axis X. As a result, the first and second planetary gears 5, 6 are revolved around the input-output axis X. Here, the external gears on the first and second planetary gears 5, 6 are in meshing with the internal gear 21. Thus, the first and second planetary gears 5, 6 are rotated respectively about the center axes Y1, Y2 while being revolved around the input-output axis X.

Where the number of teeth on the external gears of the first and second planetary gears 5, 6 is defined as Z1 and the number of teeth on the internal gear is defined as Z2, the first and second planetary gears 5, 6 are rotated relative to the housing 2 by the tooth number corresponding to (Z2−Z1) during one turn of the crankshaft 3. That is, relative to the housing 2, the first and second planetary gears 5, 6 perform a revolution movement through one turn with the eccentricity e as radius and a rotation movement through the rotation of {(Z2−Z1)/Z2}. The rotation movement is transmitted to the first and second side plates 4, 8 operating as output shaft, through the engaging holes 51, 61 of the first and second planetary gears 5, 6 and the press-fitting shaft portions 71 of the pins 7. At this time, the press-fitting shaft portions 71 of the pins 7 are rotated to be inscribed in the engaging holes 51, 61, and hence, the first and second side plates 4, 8 are rotated to be operated together with the rotation movements of the first and second planetary gears 5, 6. That is, the rotation of the crankshaft 3 is reduced in speed to be transmitted to the first and second side plates 4, 8.

Although in the foregoing, the first and second side plates 4, 8 are made as the output shaft, the housing 2 can be provided rotatably with the first and second side plates 4, 8 fixed, to operate the housing 2 as output shaft. In this case, when the crankshaft 3 as input shaft is rotated, the first and second planetary gears 5, 6 are revolved but is restrained from rotating. However, the revolutions of the first and second planetary gears 5, 6 cause the housing 2 as output shaft to rotate.

In the foregoing embodiment, the pins 7 are press-fitted into the press-fitting hole portions 41a of the first side plate 4 to be secured to the first side plate 4. Then, because the pins 7 are inscribed in the engaging holes 51, 61, the center axes of the plurality of pins 7 are desired to be in parallel to the input-output axis X. That is, it is desired that the plurality of pins 7 agree accurately in degree of parallelization. Further, the end portions of the pins 7 are secured by the bolts 15 to the second side plate 8. Accordingly, also in terms of assembling, the plurality of pins 7 are desired to agree accurately in degree of parallelization. In the foregoing embodiment, it is possible to make the plurality of pins 7 agree very accurately in degree of parallelization. The reason for this will be described hereinafter.

Figure 3:
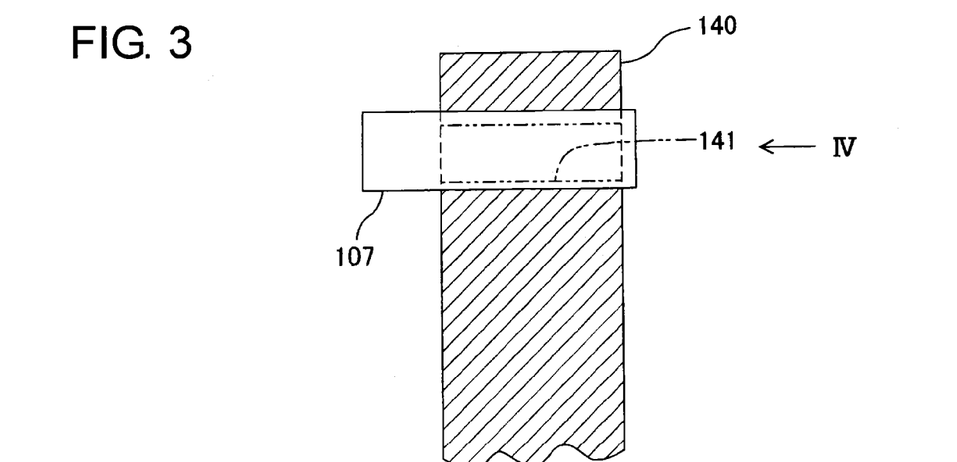
[FIG. 3] is a conceptual view showing the displacement of a pin at the time of a pin press-fitting where in a disc-like member being identical in outside diameter in the axial direction, the pin is press-fitted in a hole being identical in inside diameter over the axial direction.
Figure 4:
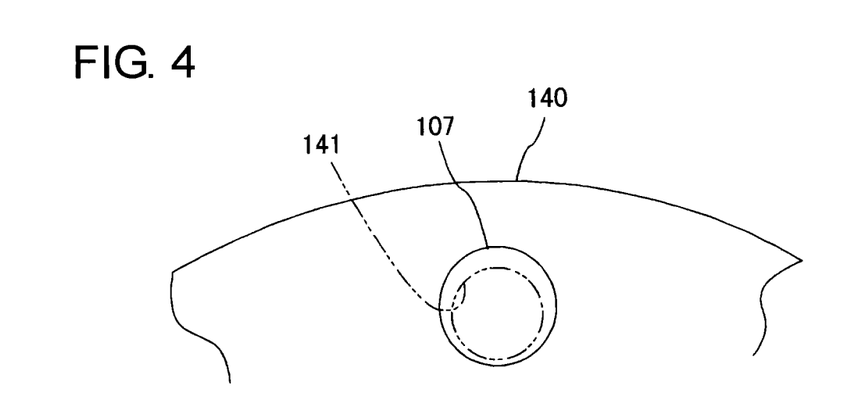
[FIG. 4] is a view from the arrow IV in FIG. 3 (view on right side in FIG. 3).

First, consideration is taken into the case where as shown in FIGS. 3 and 4, each pin 107 is press-fitted into the hole 141 (indicated by the phantom line) of a disc-like member 140. It is assumed that the outside diameter of the pin 107 is identical over the axial length. It is also assumed that the outside diameter of the disc-like member 140 corresponding to the first side plate 4 and the inside diameter of the hole 141 corresponding to the press-fitting hole portion 41a are each identical over the axial length.

In this case, when the pin 107 is press-fitted into the hole 141, the hole 141 is enlarged to generate a tensile stress around the hole 141. Since in the disc-like member 140, the thickness in the radial direction of the portion that is on the radially outside with respect to the hole 141 is thinner than the thickness in the radial direction of the portion that is on the radially inside with respect to the hole 141, the center axis of the pin 107 is displaced almost in parallel toward the radial outside being a thinner side beyond the center axis of the hole 141.

Figure 5:
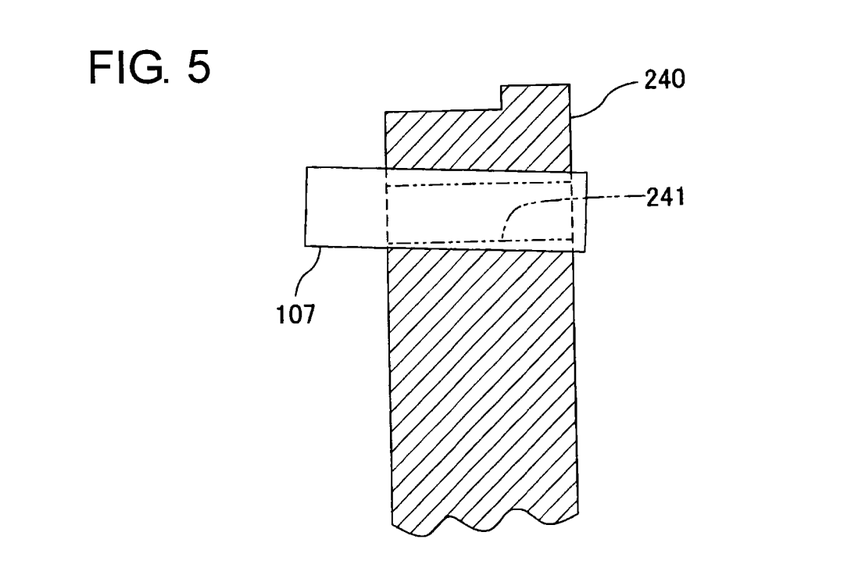
[FIG. 5] is a conceptual view showing the displacement of a pin at the time of a pin press-fitting where in a disc-like member differing in outside diameter in the axial direction, the pin is press-fitted in a hole being identical in inside diameter over the axial direction.

Although it is the case here that the outside diameter of the disc-like member 140 is identical over the axial length, the outside diameter of the first side plate 4 differs in the axial direction, as shown in the present embodiment. Thus, consideration is next taken into the case where in a disc-like member 240 the outside diameter of which, as shown in FIG. 5, differs in the axial direction similarly to the first side plate 4, the pin 107 is press-fitted into a hole 241 (indicated by the phantom line) of the inside diameter being identical over the axial length.

Figure 6:
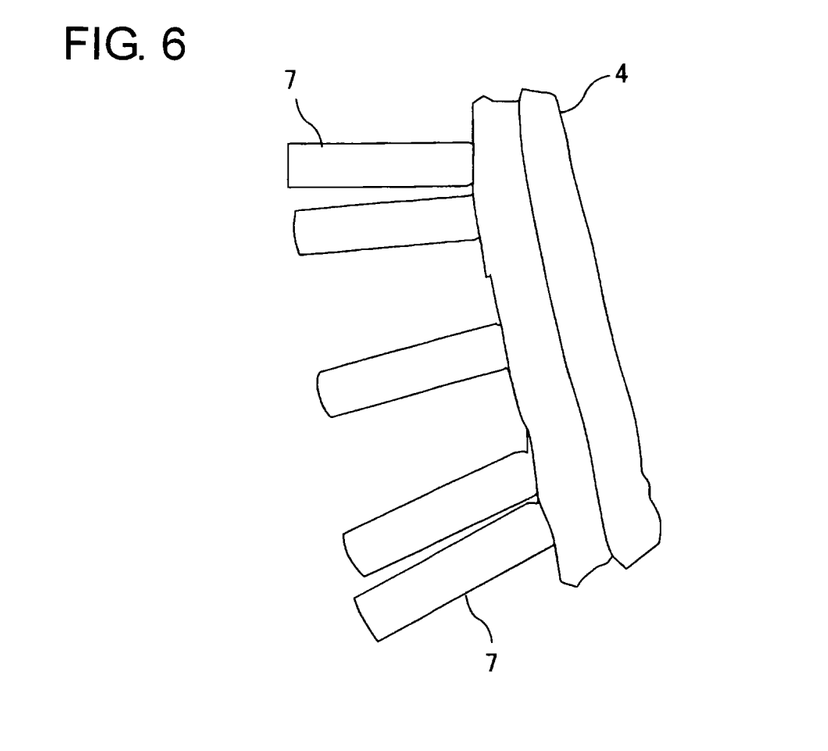
[FIG. 6] is an illustration obtained through a CAE analysis of the displacements of a first side plate and pins at the time of pin press-fitting where the disc-like member shown in FIG. 5 is used as the first side plate, wherein the displacements are expressed in an exaggerated scale.

In this case, the portion on the radial outside of the hole 241 differs in the radial thickness in the axial direction. That is, of the disc-like member 240, the portion being on the radial outside of the hole 241 is high in rigidity at the part on the large-diameter side in comparison with the part on the small-diameter side. Thus, the center position of the pin 107 is displaced larger toward the radial outside at the small-diameter side being thin in the radial thickness rather than at the large-diameter side being thick in the radial thickness. As a result, the center axis of the pin 107 is inclined relative to the center axis of the hole 241. For this reason, if the hole 41 of the first side plate 4 were made to be identical over the axial length as shown in FIG. 5, one end portions (left side in FIG. 1) in the axial direction of the respective pins 7 would be displaced radially outward in comparison with the other end portions (right side in FIG. 1) in the axial direction of the pins 7. Thus, as illustrated by the result of a CAE analysis in FIG. 6, the center axes of the pins 7 would be inclined relative to the center axis of the first side plate 4 to relatively open at one end portions (left side in FIG. 5) in the axial direction of the pins 7. Here, the result of the CAE analysis illustrated in FIG. 6 is expressed with the displacement amounts exaggerated.

Figure 7:
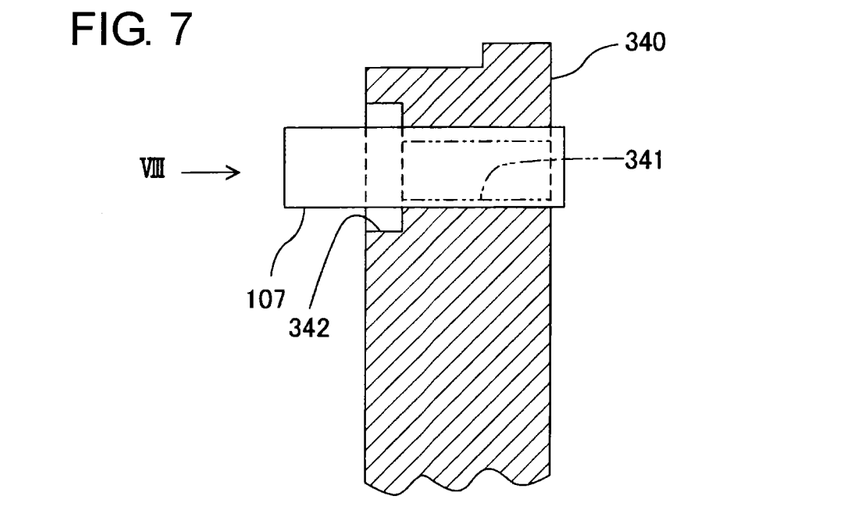
[FIG. 7] is a conceptual view showing the displacement of a pin where in a disc-like member differing in outside diameter in the axial direction, the pin is inserted into a hole which is provided with a press-fitting hole portion and a small-diameter side concavity.
Figure 8:
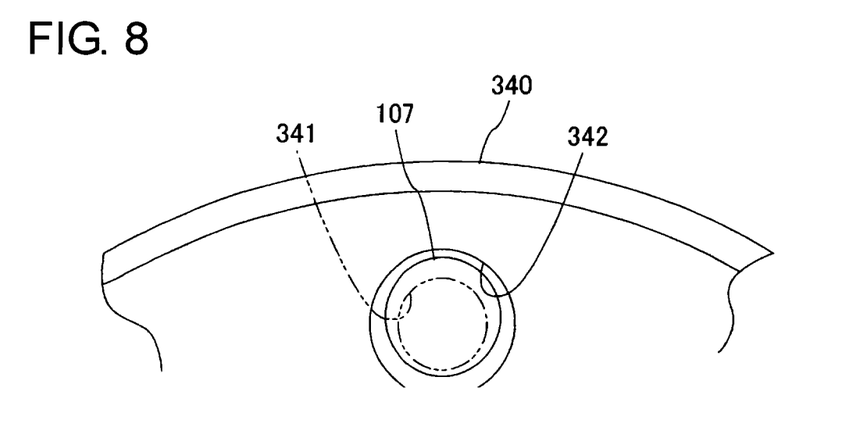
[FIG. 8] is a view from the arrow VIII in FIG. 7 (view on left side in FIG. 7).

Next, consideration is taken into the case where in a disc-like member 340 which, like the first side plate 4, differs in the outside diameter in the axial direction as shown in FIGS. 7 and 8, the pin 107 is press-fitted into a press-fitting hole portion 341 (indicated by the phantom line) of the inside diameter being identical over the axial direction. In this case, however, the disc-like member 340 is provided with a small-diameter side concavity 342 corresponding to the small-diameter side concavity 41b in the foregoing embodiment. However, the disc-like member 340 is not provided with a concavity corresponding to the large-diameter side concavity 41c. That is, the press-fitting hole portion 341 is formed in the axial direction between the other end surface (right side in FIGS. 7 and 8) in the axial direction of the disc-like member 340 and the small-diameter side concavity 342.

In this case, the portion on the radial outside of the press-fitting hole portion 341 differs in radial thickness in the axial direction. Thus, the center position of the pin 107 would tend to be displaced large toward the radial outside on the small-diameter side being thin in radial thickness rather than on the large-diameter side being thick in radial thickness. However, the small-diameter side concavity 342 is out of contact with the external surface of the pin 107 and hence, the press-fitting force imposed by the pin 107 does not directly act on the small-diameter side concavity 342. Thus, the portion of the small-diameter side concavity 342 is hard to be deformed. Therefore, by the provision of the small-diameter side concavity 342, the portion on the small-diameter side of the disc-like member 340 acts to prevent the center position of the pin 107 from being displaced radially outward. That is, by press-fitting the pin 107 into the press-fitting hole portion 341, it becomes possible to balance the amount by which the part on the large-diameter side of the disc-like member 340 is deformed in the radial direction, with the amount by which the part on the small-diameter side of the disc-like member 340 is deformed in the radial direction. Accordingly, it is possible to prevent the center axis of the pin 107 from being inclined relative to the center axis of the press-fitting hole portion 341.

Figure 9:
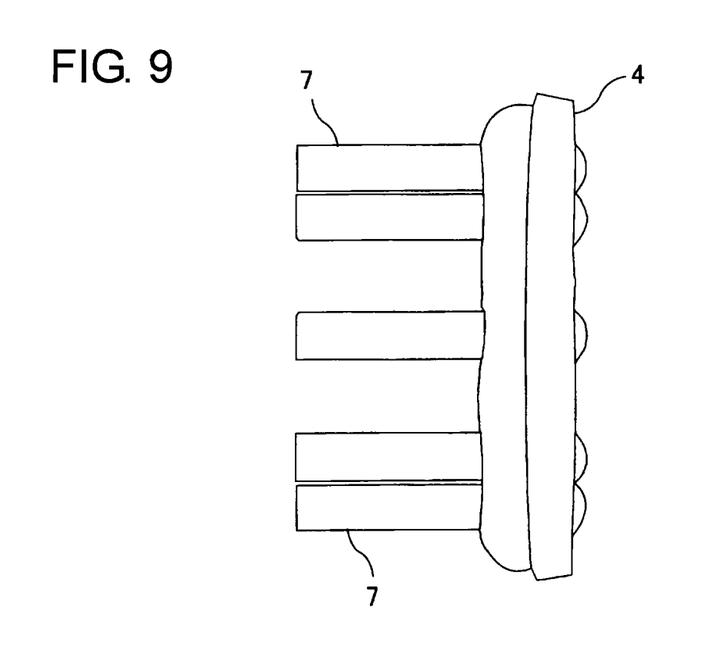
[FIG. 9] is an illustration obtained through a CAE analysis of the displacements of a first side plate and pins at the time of pin press-fitting where the disc-like member shown in FIG. 7 is used as the first side plate, wherein the displacements are expressed in an exaggerated scale.

In the case where the hole 41 of the first side plate 4 is configured only by the press-fitting hole portion 341 and the small-diameter side concavity 342 as shown in FIGS. 7 and 8, that is, where the hole 41 of the first side plate 4 is provided only with the press-fitting hole portion 41a and the small-diameter side concavity 41b, the center axis of the pin 7 is displaced almost in parallel to the center axis of the press-fitting hole portion 41a. That is, as illustrated by the result of a CAE analysis in FIG. 9, the plurality of pins 7 agree in the degree of parallelization. Like this, by providing the small-diameter side concavities 41b, the plurality of pins 7 can be made to agree accurately in the degree of parallelization without being inclined relatively. Consequently, by suppress-ing local wears of the pins 7, it can be realized to prolong the service life, and it is possible to reduce the fluctuation in transmission torque.

Figure 10:
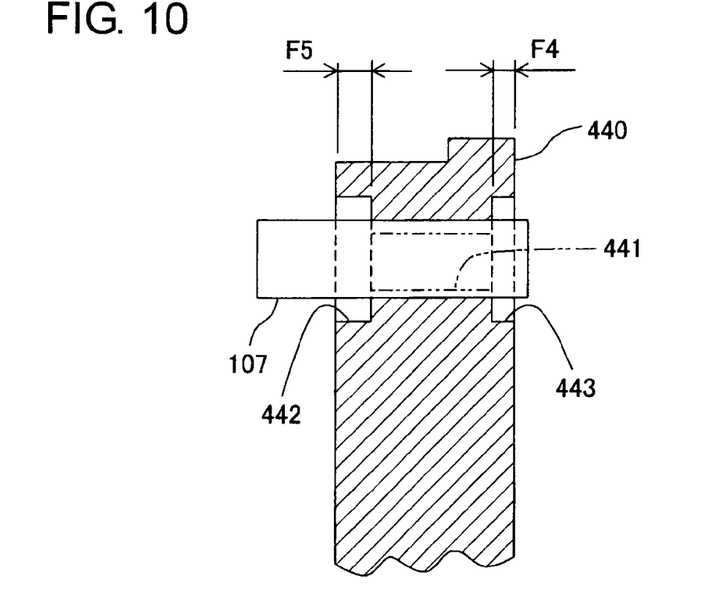
[FIG. 10] is a conceptual view showing the displacement of a pin where in a disc-like member differing in outside diameter in the axial direction, the pin is inserted into a hole which is provided with a press-fitting hole portion, a small-diameter side concavity and a large-diameter side concavity.

Next, consideration is taken into the case where a disc-like member 440 is made to a shape similar to the first side plate 4 in the present embodiment. That is, the outside diameter of the disc-like member 440 differs in the axial direction, and the disc-like member 440 is provided with press-fitting hole portions 441 corresponding to the press-fitting hole portions 41a, small-diameter side concavities 442 corresponding to the small-diameter side concavities 41b, and large-diameter side concavities 443 corresponding to the large-diameter side concavities 41c.

In this case, the portion on the radial outside of each press-fitting hole portion 441 differs in radial thickness in the axial direction. Thus, the center position of the pin 107 would tend to be displaced large toward the radial outside at the small-diameter side being thin in radial thickness rather than at the large-diameter side being thick in radial thickness. However, the small-diameter side concavity 442 and the large-diameter side concavity 443 are out of contact with the external surface of the pin 107 and hence, the press-fitting force by the pin 107 does not act directly thereto. Thus, the small-diameter side concavity 442 and the large-diameter side concavity 443 are hard to be displaced. Thus, the small-diameter side concavity 442 and the large-diameter side concavity 443 act to prevent the center position of the pin 107 from being displaced toward the radial outside. That is, by press-fitting the pin 107 into the press-fitting hole portion 441, it is possible to adjust the balance between the amount by which the part on the large-diameter side of the disc-like member 440 is deformed in radial direction, the amount by which the part of the small-diameter side concavity 442 restricts the deformation in the radial direction, and the amount by which the part of the large-diameter side concavity 443 restricts the deformation in the radial direction. Accordingly, it is possible to prevent the center axis of the pin 107 from being inclined relative to the center axis of the press-fitting hole portion 441. When a CAE analysis was carried out in this case, the result similar to that in FIG. 9 was obtained.

Figure 11:
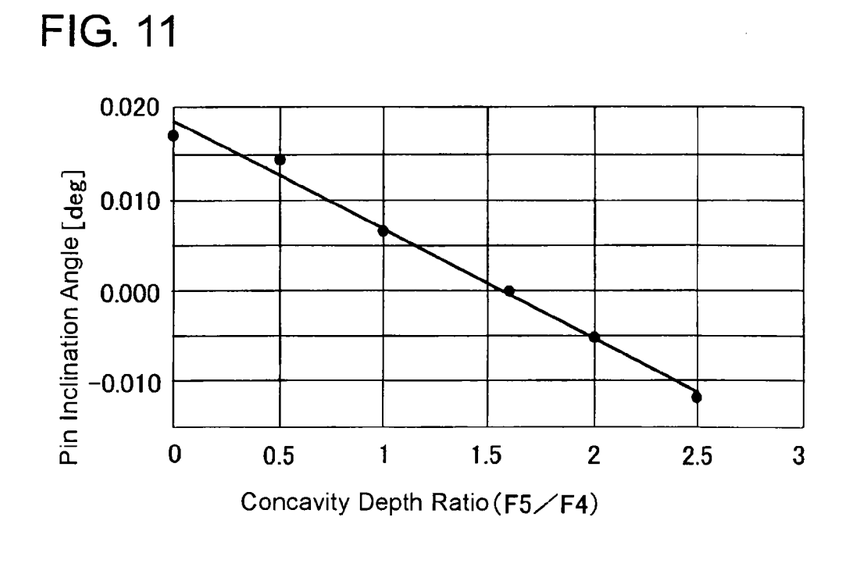
[FIG. 11] is a graph showing the relation between concavity depth ratio and pin inclination angle.

The inclination angle of the pin 107 was analyzed where changes were made in the depth F5 of the small-diameter side concavity 442 and the depth F4 of the large-diameter side concavity 443. FIG. 11 shows the result. In FIG. 11, the axis of abscissas is set as the ratio (F5/F4) of the depth F5 of the small-diameter side concavity 442 to the depth F4 of the large-diameter side concavity 443, and the axis of ordinate is set as the inclination angle of the pin 107. As shown in FIG. 11, the depth ratio and the inclination angle have an almost linear relation in which the inclination angle becomes smaller as the depth ratio becomes large. Here, the inclination angle becomes zero around a depth ratio of 1.6. Further, the inclination angle changes in dependence on the inside diameters of the small-diameter side concavity 442 and the large-diameter side concavity 443. Therefore, it is possible to make the inclination angle zero by suitably adjusting the depths and the inside diameters of the small-diameter side concavity 442 and the large-diameter side concavity 443.

Figure 12:
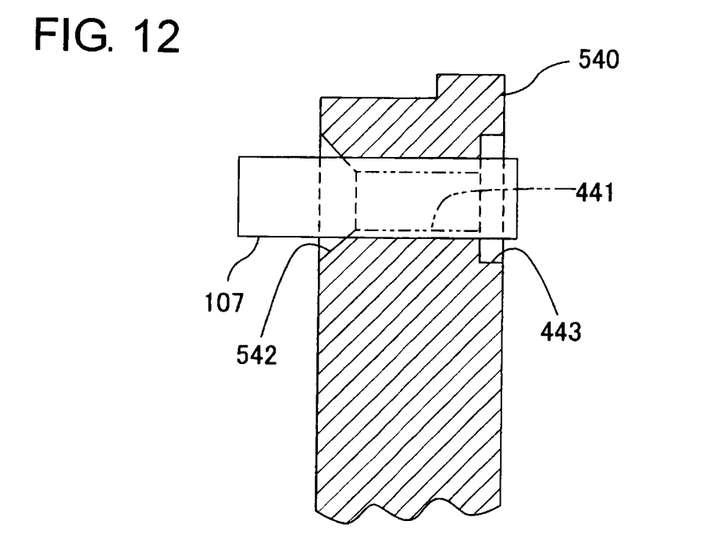
[FIG. 12] is a conceptual view showing the displacement of a pin where in a disc-like member differing in outside diameter in the axial direction, the pin is inserted into a hole which is provided with a press-fitting hole portion, a small-diameter side concavity of a taper shape and a large-diameter side concavity.

Next, consideration is taken into the case where from the disc-like member 440 shown in FIG. 10, a disc-like member 540 is altered to form a small-diameter side concavity 542 to a taper shape as shown in FIG. 12. Also in this case, like that in FIG. 10, it is possible not to incline the center axis of the pin 107 relative to the center axis of the press-fitting hole portion 441. However, it is necessary to suitably adjust the depths and the inside diameters of the small-diameter side concavity 542 and the large-diameter side concavity 443.

Figure 13:
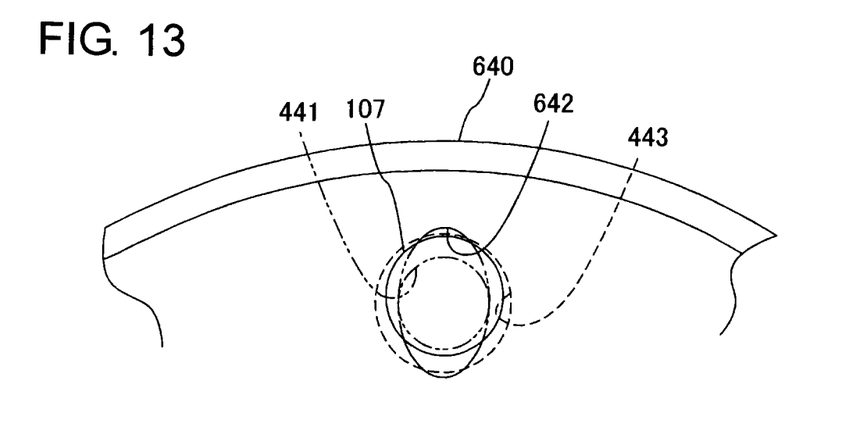
[FIG. 13] is a view of a disc-like member having a small-diameter side concavity of an elliptical shape viewed in the axial direction (view corresponding to a left side view in FIG. 10).

Further, as shown in FIG. 13, from the disc-like member 440 shown in FIG. 10, a disc-like member 640 is altered to form a small-diameter side concavity 642 to an elliptical shape shown in FIG. 13 as viewed in the axial direction. The small-diameter side concavity 642 before the press-fitting of the pin 107 is made to have the major axis of the elliptical shape aligned in the radial direction of the disc-like member 640. Further, the small-diameter side concavity 642 before the press-fitting of the pin 107 is made to be smaller in the minor axis of the elliptical shape than the outside diameter of the pin 107.

That is, the internal surface of the small-diameter side concavity 642 has parts that are longer in the distance from the center of the press-fitting hole portion 441 than the radius of the press-fitting hole portion 441, and these parts, when viewed in the axial direction, are located at at least the radial inside and the radial outside of the disc-like member 640 with respect to the press-fitting hole portion 441. In this case, the minor axis parts of the small-diameter side concavity 642 are deformed by the press-fitting of the pin 107, whereas the major axis parts of the small-diameter side concavity 642 are hardly deformed even by the press-fitting of the pin 107. Accordingly, similarly to the case in FIG. 10, it is possible not to incline the center axis of the pin 107 relative to the center axis of the press-fitting hole portion 441. However, it is necessary to suitably adjust the major axis and the minor axis of the small-diameter side concavity 642 as well as the depths and the inside diameters of the small-diameter side concavity 642 and the large-diameter side concavity 443.

As described hereinabove, according to the present embodiment, it is possible to make the plurality of pins 7 agree accurately in the degree of parallelization without being inclined relatively. Consequently, by suppressing local wears of the pins 7, it can be realized to prolong the service life, and it is possible to reduce the fluctuation in transmission torque.

Further, it is also possible to apply the disc-like members shown in FIGS. 7, 12 and 13 to the first side plate 4. Further, although in the present embodiment, the configuration is take to be provided with two planetary gears, the configuration is applicable in the case of one planetary gear or three or more planetary gears. Further, various tooth forms such as involute tooth, trochoid tooth or the like are applicable to the tooth form of the planetary gears, and the tooth form suffices to be one that enables the planetary gears as external gears to mesh with the internal gear and to rotate. Further, although in the present embodiment, the construction is taken that the end surfaces of the pins 7 are held in contact with the second side plate 8, there may be taken a construction that back facing holes are provided on the second side plate 8 and that parts of the pins 7 are inserted thereinto.

DESCRIPTION OF SYMBOLS

1: planetary gear reducer, 2: housing, 21: internal gear, 3: crankshaft, 31, 32: eccentric cam portion, 4: first side plate, 41: hole, 41*a*: press-fitting hole portion, 41*b*: small-diameter side concavity, 41*c*: large-diameter side concavity, 5, 6: planetary gear, 51, 61: engaging hole, 7: pin, 71: press-fitting shaft portion, 72: engaging head portion, 8: second side plate

The invention claimed is:

1. A planetary gear reducer comprising:
a planetary gear having a revolution center located inside the planetary gear and provided with a plurality of engaging holes passing therethrough in an axial direction;
a carrier; and
a plurality of pins secured to the carrier and passing through the engaging holes for operating the carrier together with rotation movement of the planetary gear through engagements with the engaging holes;
wherein:
the carrier comprises a first side plate that is formed to a disc plate shape and that fixes the pins thereto to protrude the pins from one end surface in the axial direction;
the outside diameter of the first side plate is formed to be a small diameter on one side in the axial direction and a large diameter on the other side in the axial direction; and
the first side plate is provided with:
press-fitting hole portions with the pins press-fitted thereinto;
small-diameter side concavities that are formed at the press-fitting hole portions on the one side in the axial direction, that open to the one end surface in the axial direction of the first side plate and that have internal surfaces being out of contact with the pins at at least parts thereof, and
the plurality of pins each have a press-fitting shaft portion that has a constant outside diameter in an axial direction, the press-fitting shaft portions being press fitted into the press-fitting hole portions and passing through the engaging holes.

2. The planetary gear reducer in claim 1, wherein:
the carrier is provided with a second side plate that is arranged to face the first side plate to put the planetary gear between itself and the first side plate and that fixes the pins thereto.

3. The planetary gear reducer in claim 1, wherein the small-diameter side concavities have a substantially constant diameter.

4. The planetary gear reducer in claim 1, wherein:
the press-fitting hole portions are formed in the axial direction between another end surface of the first side plate in the axial direction and the small-diameter side concavities of the first side plate.

5. The planetary gear reducer in claim 1, wherein:
the internal surface of the small-diameter side concavity has parts whose distances from the center of the press-fitting hole portion are longer than the radius of the press-fitting hole portion; and
the parts are located, as viewed in the axial direction, on at least the radial inside and the radial outside of the first side plate with respect to the press-fitting hole portion.

6. The planetary gear reducer in claim 5, wherein:
the internal surface of the small-diameter side concavity is formed to be out of contact with the pins over the whole circumference thereof.

7. The planetary gear reducer in claim 1, wherein:
the first side plate is provided with large-diameter side concavities formed at the press-fitting hole portions on the other side in the axial direction, opening to another end surface in the axial direction of the first side plate, and having internal surfaces being out of contact with the pins; and
the press-fitting hole portions are formed in the axial direction between the small-diameter side concavities and the large-diameter side concavities.

8. The planetary gear reducer in claim 7, wherein:
each pin is provided with an engaging head portion formed at an end portion of the press-fitting shaft portion and being larger in circumscribed circle diameter than the press-fitting shaft portion; and the large-diameter side concavity receives the engaging head portion and engages and stops the engaging head portion.

9. The planetary gear reducer in claim 7, wherein the small-diameter side concavities have a substantially constant first diameter and the large-diameter side concavities have a substantially constant second diameter which is greater than the first diameter.

* * * * *